INVENTORS.
Howard G. Wands
Henry R. Hogendobler
BY
ATTORNEY.

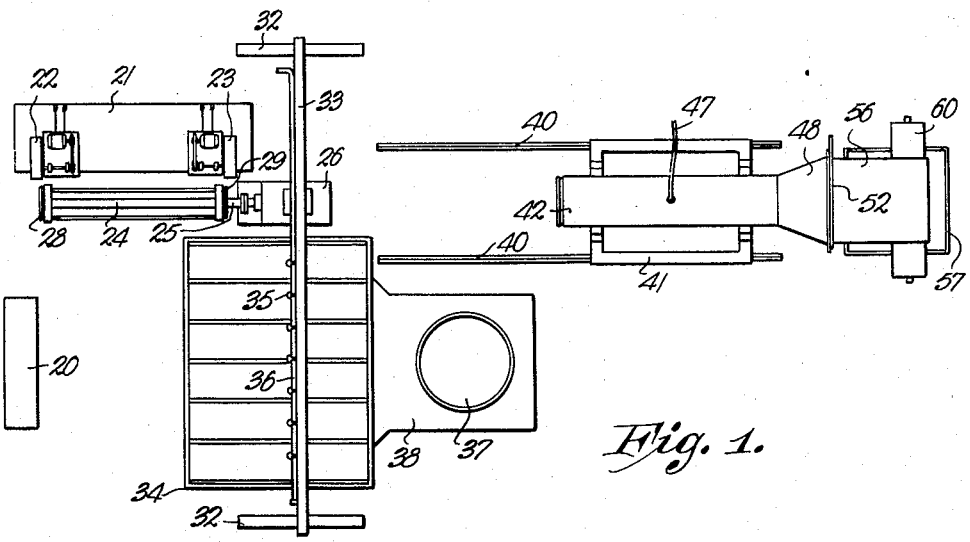
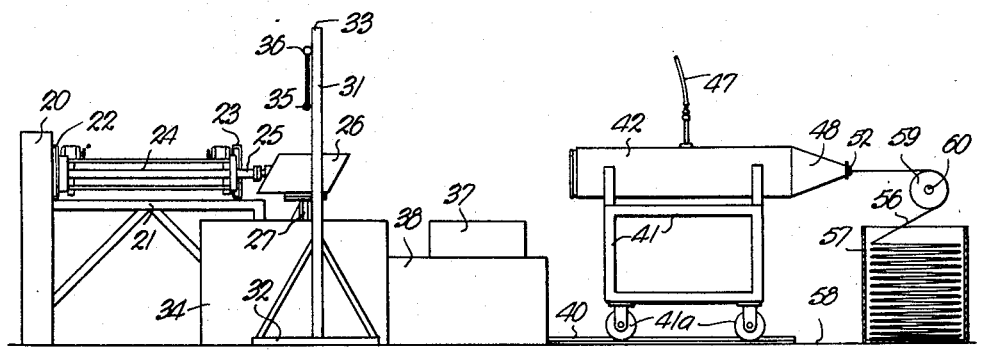
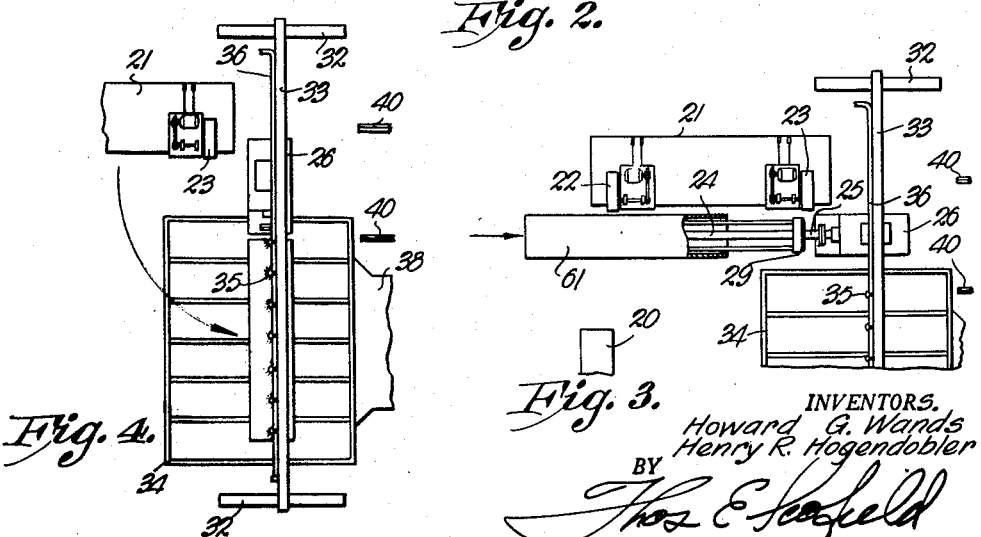

INVENTORS.
Howard G. Wands
Henry R. Hogendobler
BY
ATTORNEY.

United States Patent Office 2,952,298
Patented Sept. 13, 1960

2,952,298

METHOD AND APPARATUS FOR AFFIXING FLEXIBLE TUBING TO WORK PIECES USING TUBING FROM A CONTINUOUS SOURCE

Henry R. Hogendobler, Prairie Village, Kans., and Howard G. Wands, Kansas City, Mo., assignors to Gustin-Bacon Manufacturing Company, a corporation of Missouri Filed Dec. 17, 1959, Ser. No. 860,173

13 Claims. (Cl. 154—41)

This invention relates to methods of and apparatus for applying resilient sleeves to the outer surfaces of bodies and refers more particularly to such methods and apparatus wherein flexible plastic tubing is applied to work pieces from a continuous roll of tubing, successive portions of the flexible tubing first expanded to an inside dimension greater than the outer dimension of the work pieces by application of vacuum there to permit the insection of the latter within the tubing.

This invention is an improvement over the application of Joseph F. Stephens, et al., Serial No. 766,071, filed October 8, 1958 for "Method and Apparatus for Applying Resilient Sleeves."

This invention is particularly applicable to and will be described relative to the application of resilient plastic sleeves to the external surfaces of relatively resilient walled ducts and pipes, but it will be understood that the method and apparatus are adaptable to the application of resilient sleeves to the external surfaces of any types of bodies. Ducts and pipes formed from resilient mats fabricated from fine diameter glass fibers bonded with plastic binders are currently being used in great quantities. It is eminently desirable in many instances to have smooth coverings on the outer surfaces of these ducts and pipe sections. Various means have been developed by applying plastic sheets of vinyl and the like to the outside surfaces of pipe sections and mats. However, the conventionally available methods and their results have not proved satisfactory. In the first place, the fitting of the sleeves on the ducts has not proved satisfactory and both wrinkling and inadequate holding of the seams of the sleeves have been encountered. Therefore, it would be greatly desirable to provide methods of and apparatus for applying formed tubes of resilient plastic material and the like to the external surfaces of such ducts. Such methods and apparatus must lend themselves to present high speed mass production techniques and provide a uniform, attractive product.

In the application of Stephens et al., supra, a method of applying a plastic sleeve to a work piece was provided employing individual pieces of plastic tubing cut slightly longer than a vacuum expansion tube. The longitudinal seam on the plastic sleeve was sealed in a fashion which made it necessary to turn each sleeve inside out before using. The sleeve was then inserted through the vacuum tube and both ends folded back over the extended inner wall of the vacuum tube. Vacuum was applied, the work piece inserted in the vacuum tube inside the expanded sleeve, the vacuum released, the ends of the sleeve unfolded from the vacuum tube and the work piece with the plastic sleeve thereon removed from the vacuum vessel. This latter disclosed method, while embodying a number of improvements over the art, also embodies a number of shortcomings and disadvantages which are enabled to be overcome in the instant method and apparatus.

Therefore, an object of the invention is to provide methods of and apparatus for applying resilient sleeves to the outer surfaces of bodies.

Another object of the invention is to provide methods of and apparatus for expanding resilient sleeves to an internal dimension greater than the normal internal dimension of the sleeve whereby to permit insertion of bodies of external dimensions close to or equal the normal internal dimensions of the sleeves therein.

Another object of the invention is to provide methods of and apparatus for applying resilient sleeves to bodies which permit the safe, fast and accurate application of the sleeves to the body with a resultant uniform highly attractive product.

Another object of the invention is to provide such methods of and apparatus for applying resilient sleeves to bodies which have adhesive spread over large portions of the exterior surfaces or surface thereof.

Another object of the invention is to provide such methods and apparatus which require a minimum amount of manual labor, a minimum amount of skilled handling of materials and the like.

Still another object of the invention is to provide such methods and apparatus wherein the resilient sleeve may be expanded for slipping over the body by a single man.

Yet another object of the invention is to provide methods of and apparatus for applying resilient sleeves to bodies which allow the use of a plastic tube made with a continuous lap seal, thereby eliminating cutting charges.

Another object of the invention is to provide such methods and apparatus which eliminate the necessity of folding the plastic tube or sleeve over one end of the expanding vacuum vessel or tube.

Still another object of the invention is to provide methods and apparatus which conveniently handle a continuous tube operation of applying resilient sleeves to cylindrical or other form bodies by vacuum expansion, simple, relatively cheap, high speed means and methods being provided for expanding the tube in a vacuum vessel, inserting the work piece into the expanded tube, releasing the vacuum from the sleeve, removing the sleeve-enclosed work piece from the vacuum vessel, severing the applied sleeve from the continuous sleeve supply and recharging the vacuum vessel.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

Fig. 1 is a plan view of an arrangement of apparatus for the application of resilient sleeves to hollow ducts with adhesive on the exterior surfaces thereof.

Fig. 2 is a side view of the apparatus of Fig. 1, the views of Figs. 1 and 2 taken at the beginning of the inventive process with the plastic sleeve or tube from the continuous roll supply thereof expanded within the vacuum vessel, but before the work piece is applied to the mounting mandrel therefor.

Fig. 3 is a partial plan view of the second stage of the inventive process in the apparatus of Figs. 1 and 2 wherein the work piece or duct is being applied to the work piece mounting means.

Fig. 4 is a partial plan view illustrating a sequential step in the operation of the inventive process following Fig. 3 wherein the mounted duct or work piece has been moved under apparatus operative to apply an adhesive coat thereto.

Figure 5:
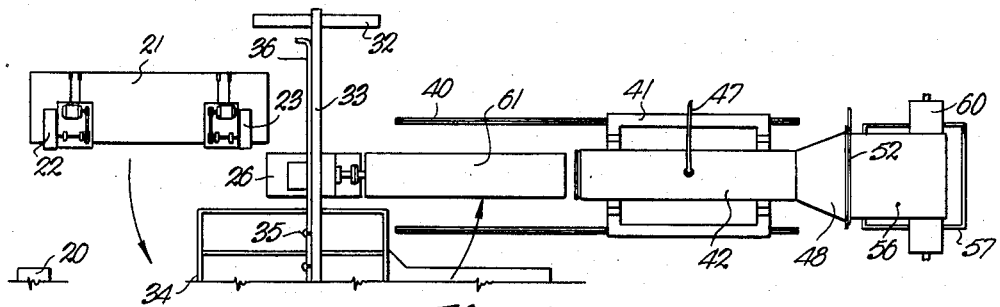
Fig. 5 is a sequential plan view subsequent to Fig. 4 wherein the adhesive carrying duct has been moved from the position of Fig. 4 to yet a third position for application of the sleeve thereto.
Figure 6:
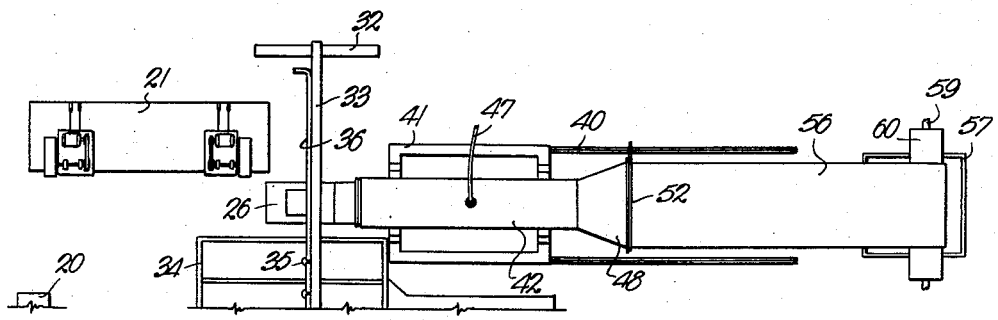
Fig. 6 is a sequential plan view to Fig. 5 wherein the sleeve expanding means has been moved over the adhesive-carrying duct.

The general layout of the apparatus shown in sequential operation in Figs. 1, 2, 3, 4, 5, 6, 7 and 10 will be first described. Referring particularly to Figs. 1 and 2, at 20 is shown the control panel for the entire operating process. The numeral 21 designates a table supporting two power saws 22 and 23. A mandrel 24 is rotatably mounted on shaft 25 which is driven by a motor positioned within hooded section 26. Section 26 is pivotally mounted on legs 27 to permit the pivoting of the mandrel 24 180° counterclockwise, to an opposite position from that shown in Fig. 1. Means are provided such as expandable circumferential rubber tubes 28 and 29 at the ends of the mandrel operated by air pressure to expand and contract to grip and release bodies slipped onto the mandrel having inner diameters substantially that of the outer diameter of the mandrel.

A frame having vertical members 31 fixed at their lower ends to horizontal floor based members 32 and topped by horizontal top member 33 is provided extending over the mandrel mounting frame 27 and also over tank 34. The latter is of a width in the direction of member 33 substantially greater than the length of mandrel 24 and of a length in the direction of members 32 substantially greater than the width of mandrel 24. A plurality of spray nozzles 35 are provided suspended from member 33 and connected to flow line, pipe or hose 36. Flow line 36 carries an adhesive solution to spray heads 35 which operate to spray the adhesive in a uniform, diffused manner downwardly into the tank 34 and over any article such as a body mounted on mandrel 24 which is spaced between the spray heads and the tank. Means such as a conventional fan or the like are provided at 37 connected by duct 38 to the underside of tank 34 to provide a flow of air into the tank which will tend to draw spray particles of adhesive thereinto and also remove any fumes of adhesive from the air in the vicinity.

A pair of tracks 40 extend parallel to table 21 and the position of the mandrel in Fig. 1 and equally spaced on each side of the latter. A frame 41 is mounted on said tracks 40 by wheels 41a to permit motion of the frame back and forth on the tracks 40 toward and away from legs 27.

The invention, both apparatus and method, will be described relative to the application of a vinyl plastic sheet to a relatively resilient wall duct formed of glass fiber mat. A cylindrical duct of the type disclosed in the patent to Stephens, No. 2,790,464, issued April 30, 1957, entitled "Insulated Duct" fabricated of a mat of the character disclosed in Stephens Patent No. 2,778,759, issued January 22, 1957, entitled "Thermal-Pipe Insulation" is typical of that employed as the specific example. However, other bodies of any shape, size, form, material, etc. may be employed provided the elements of the apparatus described are sized so as to fit and be usable with such bodies. A plastic sheet of film or a sheet or film of other suitable material may be employed. Vinyl plastic having a 150 percent stretch limit and a maximum 10 percent diameter increase is suitable and preferred, but other resilient film materials such as polyethylene, Saran (vinylidene chloride), etc. would also be suitable.

Figs. 1 and 2 show the entire preferred apparatus arrangement with mandrel 24 prepared to receive a hollow duct on the outer surface thereof and with the frame 41 in retracted position. In Fig. 3 a hollow cylindrical duct as above described is slid over the mandrel 24 and, thereafter, the rubber tubes 28 and 29 are expanded to grip the inner surface of the duct and fix it on the mandrel.

A typical vinyl film employed as a resilient sleeve in the invention would have a thickness of .004 to .006 inch and weight from 12 to 18 grams per square foot. The maximum tensile strength of such a film would be lengthwise from 9 to 18 pounds per inch width and crosswise from 8 to 15 pounds per inch width. Typtical maximum elongation at rupture values for such a film would be lengthwise 175 percent to 230 percent and crosswise 250 percent to 260 percent. A typical film usable in the inventive method and apparatus could be characterized as a plasticized calendered vinyl sheeting which is flame resistant and offers a tear resistant flexible vapor barrier as applied to insulation products. The sheet of film may or may not be pigmented as with aluminum or like pigment to make it translucent or opaque. Cellulose acetate is another suitable material for such a resilient film. A typical adhesive usable for such use could be a dispersion of vinyl acetate polymer combined with inorganic fillers. Many conventional readily available commercial adhesives are usable in the process.

Figs. 8, 9, 12 and 13 show the structure of one form of the inventive sleeve expanding means which is mounted on frame 41. An elongate outer shell 42 is provided which is inwardly formed near the open end thereof at 42a and tapered inwardly at the other end thereof as at 42b. Optionally positioned within shell 42 is an elongate, uniformly perforated screen or inner hollow tube 43 having perforations 44 therethrough. Screen 43 is centered within the outer hollow tube 42, extends to the ends 42a and 42b thereof, and is circumferentially welded or otherwise fixedly attached therein in sealing fashion. Perforations 44 stop short of the connections to portions 42a and 42b. The inner tube 43 is extended past outer shell 42 at the open end of the vacuum expansion apparatus and this extension is provided with enlarged rim 43a thereon of greater outside diameter than the outside diameter of tube 43. Opening 45 extends through the wall of outer tube 42 and has internally threaded block 46 having an opening therethrough matching opening 45 circumferential to the opening 45. Vacuum flowline 47 is threaded into block 46.

Figure 9:
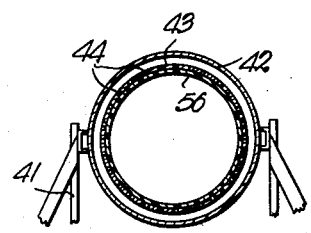
Fig. 9 is a view taken along the line 9—9 of Fig. 8 in the direction of the arrows.
Figure 12:
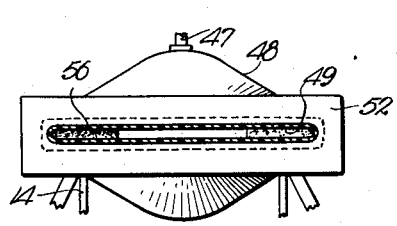
Fig. 12 is a view taken along the lines 12—12 of Fig. 8 in the direction of the arrows.
Figure 11:
Fig. 11 is a cross-sectional view of the finished product.
Figure 13:
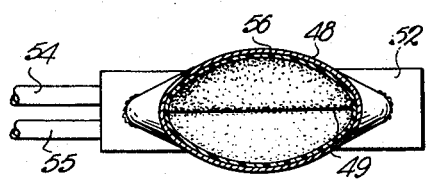
Fig. 13 is a view taken along the lines 13—13 of Fig. 8 in the direction of the arrows.

While tubes 42 and 43 are shown as cylindrical in cross section in Fig. 9, it is understood that they may be of any matching cross section, such as square, hexagonal, octagonal, etc. to match the outside form of a body or work piece to be inserted therein. If tube 43 is employed it is preferred that it be at least substantially uniformly spaced inwardly at all points from tube 42 and also that the perforations 43 be so sized relative to the vacuum which is to be pulled in the annulus between tubes 42 and 43 that a substantially uniform vacuum is provided within tube 43. Vacuum connection 47 is preferably centrally positioned of the ends of the two tubes to help provide such uniform suction.

Alternatively to the preferred sleeve expansion means above described cylinders without perforated screens therein may be employed in the manner of the patents to Roberts 2,560,369 (1951) and McKinley 2,570,259 (1951).

The tapered end or transition section 48 of the vacuum expansion apparatus beginning at 42b is formed, as may be seen from Figs. 8, 1, 12 and 13 from a matching cross section to that of tubes 42 and 43 to a lesser depth and greater width to the extremity thereof. Since the folded flat dimension of the tubing is greater than the diameter of the expanded tubing, a transition piece of some type is required. If the transition is too abrupt there is a tendency to overstress the tubing at the clamped end. The proportion of transition length to diameter provides a gradual change from "folded flat" to "expanded." Opening 49 is defined by the extremities of flattened tapered wall portion 48 and plate 50 having slot 51 therein, the former welded or otherwise fixed to the upper and lower edges of wall portion 48. Opening 49 must be slightly wider than the width of the plastic tubing in flat unfolded form and the height of the opening 49 must be sufficient to pass the tubing therethrough in flat unfolded form. Fixed to the outer faces of the flanges 50 and 51 are resilient tubing holders 52 and 53 which have open opposed sides next to opening 49. Resilient tubes 54 and 55 are positioned within said holders 52 and 53 and, upon hydraulic inflation, extrude through the opposed openings therein to clamp tubing 56 in flat unfolded form to provide an airtight seal and grip thereon. Release of pressure from tubings 54 and 55 releases tubing 56.

It is preferred that the tapered flattened portion 48 be so oriented that the opening 49 runs in a horizontal direction. However, this is not required.

Referring to Figs. 1 and 2, a source of plastic tubing in continuous form comprises a container or box 57 positioned at ground level 58 at one end of tracks 40 with roller 59 optionally but not necessarily mounted for rotation thereabove upon shaft 60 whereby tubing 56, which is shown as folded in lengths in container 57, may be extracted therefrom in uniform fashion over roller 59. The height of the upper surface of the roller is preferably vertically in line with opening 49 of the vacuum apparatus shown in Fig. 8. The vinyl sheet or film or other plastic sheet or film previously characterized has been previously formed into a continuous tube in conventional manner by sealing along one edge by any conventional adhesive or heat sealing process in conventional manner. The inside diameter of the tube is predetermined and slightly less than the inside diameter of inner tube 43 of the vacuum expansion apparatus.

Figure 8:
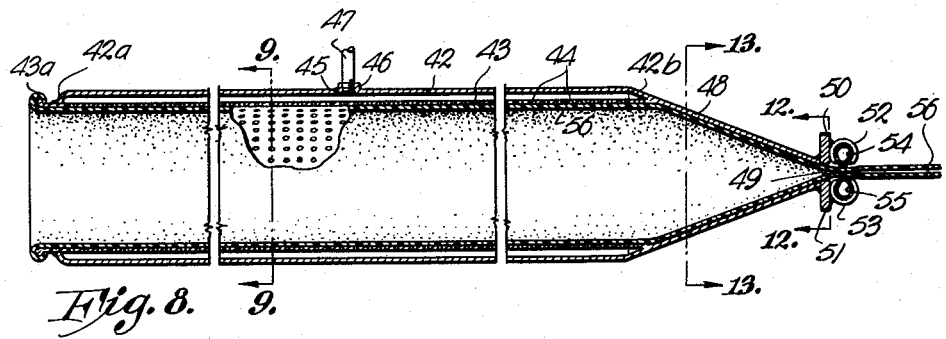
Fig. 8 is a side-sectional view through the sleeve expanding means at the process stage of Figs. 1 and 2 showing the sleeves expanded in the vacuum vessel, parts cut away for better illustration of the invention.

To start the operation, a wire with a simple hook at one end (not shown) may engage with the hook free end of tubing 56 and the nonhooked end of the wire inserted between tubes 54 and 55 through opening 49. The wire should be of sufficient length to be conveniently grasped by an operator at the free open end 43a of the vacuum expansion apparatus. The tubing is then pulled completely through the tube 43 and the free end thereof disengaged from the wire and then folded back over the enlarged rim 43a. Before folding, the seam of the tubing is aligned to be in straight position throughout its length from the source. No vacuum is drawn on the device during any of these operations. Once the tubing is correctly placed, a vacuum is pulled through line 47 by conventional means (not shown) and the resultant relationship of the tube and the apparatus is shown in Fig. 8 with the tube uniformly held along its length to the inner tube 43. Immediately before the vacuum is pulled, pressure is exerted in tubings 54 and 55 to clamp and seal the tubing. With the engagement at 43a and the clamp at opening 49, a seal is provided at each end to hold the vacuum.

While the operator is preparing the tubing as previously described, the duct or work piece is being prepared for insertion into the expanding device 42. Figs. 1 and 2 show the entire preferred apparatus arrangement before the latter operation is begun, but with the former operation completed. Thus mandrel 24 is prepared to receive a hollow duct on the outer surface thereof. Frame 41 is in retracted position during the entire charging process and remains therein during the following described operations. In Fig. 3, a hollow cylindrical duct 61, as above described, is slid over mandrel 24 and, thereafter, rubber tubes 28 and 29 are expanded to grip the inner surface of the duct and fix it on the mandrel. The length of tube 43 of the vacuum expansion apparatus is preferably at least as great or slightly greater than the length of duct 61.

Once mounted on mandrel 24, duct 61 is pivoted on shaft 25 to the position of Fig. 4 wherein, while shaft 25 is rotated, adhesive of any desired conventional type is sprayed uniformly on the surface of the mandrel. Excess of adhesive is received in vacuum tank 34. Adhesive applied, shaft 25, mandrel 24 and duct 61 are pivoted to the position of Fig. 5. The extremities of tracks 40 must be a sufficient distance from frame 27 that the duct will be able to swing into the position of Fig. 5 without contacting tube 43. Once in the position of Fig. 5 and with the first length of sleeve or tubing 56 drawn out to an expanded diameter greater than its normal inside diameter so as to place the sleeve under tension, the operator shoves frame 41 toward tank 34 along track 40 so that tube 43 slides over duct 61. Once duct 61 is entirely received within tube 43 and centered as desired therein, the vacuum may be released in the annulus between tubes 42 and 43 to permit the first length of tubing to contract onto the outer surface of the duct. The outer diameter of the duct is preferably slightly greater than the normal inside diameter of the sleeve so that the sleeve will be tensioned thereon in such fashion as to eliminate wrinkles, dimples and the like.

The sleeve must be of sufficient strength to withstand the desired expansion, but of sufficient resilience to permit such expansion under the conditions in the tube 42. The seam of tube 56 must be of sufficient strength also to stand the tension.

Figure 7:
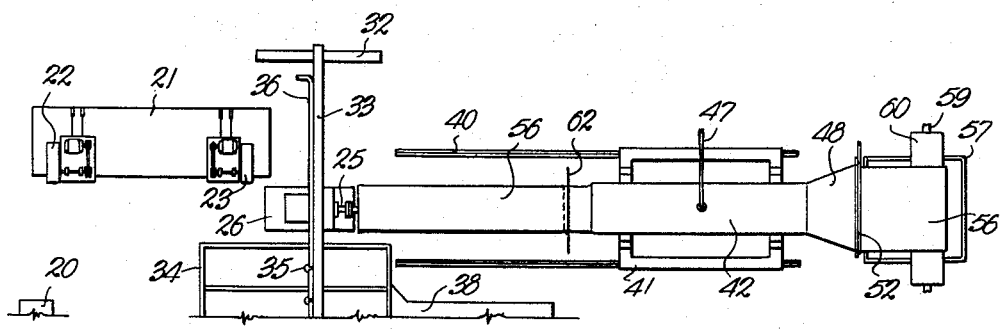
Fig. 7 is a sequential plan view of the process subsequent to Fig. 6 wherein the work piece, with the sleeve applied thereto, has been removed from the sleeve expansion means by retraction of the latter from the former with means for severing the applied sleeves from the sleeve supply shown ready for action and the vacuum means recharged with a subsequent length of sleeve.

After release of vacuum, the end of the first length of tubing 56 is unrolled from rim 43a and the clamp by tubings 54 and 55 released. It should be noted that, in Fig. 6, when the frame 41 is moved to the forward position entirely surrounding the mandrel 24, an extra or second length of tubing 56 has been pulled out over roller 60. With the first length of tubing freed at both ends thereof, frame 41 is retracted as in Fig. 7 to its original position of Fig. 1. This movement (1) frees mandrel 24, duct 61 and the first length of tubing from the vacuum expansion apparatus and (2) passes the second length of tubing 56 through opening 49 into the vacuum expansion apparatus. The clamping action of tubes 54 and 55 is then applied. As duct 61 is already fixed on mandrel 24 by the expansion of tubes 28 and 49, at this time, frame 41 may be rolled very slightly toward the source 57 of tubing 56 to tension the length of tubing between the end 43a of the vacuum expansion apparatus and the end of duct 61 which is shown in dotted lines in Fig. 7. Any suitable cutting apparatus, particularly and preferably an electrically heated wire 62 as seen in Fig. 7, may then be passed downwardly between the end of the duct 61 and end 43a of the vacuum expansion apparatus to sever the first length of tubing from the second length of tubing.

Figure 10:
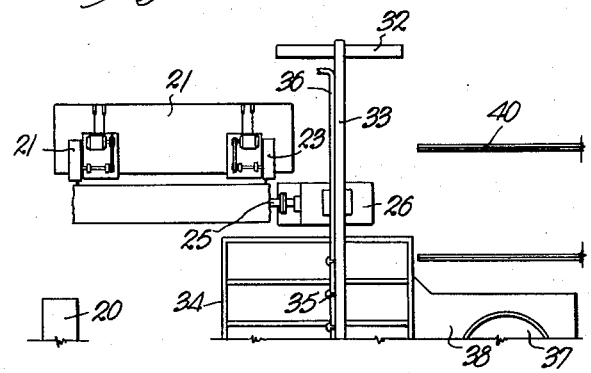
Fig. 10 is a sequential view of the process subsequent to Fig. 7 wherein the sleeve carrying duct has been returned to the original duct mounting position and the cutting operation wherein the ends of the sleeve mounting duct are cut off is being practiced.

After severance, the sleeve covered duct 61 is swung to the position of Fig. 10 where the ends thereof are trimmed by saws 22 and 23 and duct 61 removed from the mandrel by release of pressure in tubings 28 and 29. In the meantime, the free open end of the second length of tubing 56 may be rolled over rim 43a and the clamp at opening 49 maintained for the second application of vacuum to again begin the process as previously described. Until the entire length of tubing 56 is used up, the operator may continue, successively applying sleeves to individual ducts with no action required on the part of the operator to move the sleeve into the duct other than manipulating the proper clamps and releases and moving frame 41 to and fro. If an odd length of the tubing 56 is left as the end approaches, this may be trimmed outside opening 49 past the clamp and the remaining excess cut off in the sawing operation of Fig. 10 previously described.

From the foregoing, it will be seen that this invention is one well adapted to attain all of the ends and objects hereinabove set forth together with other advantages which are obvious and which are inherent to the structure and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for expanding a portion of a continuous strip of resilient tubing to permit the insertion of a work piece therein comprising an elongate shell forming a hollow tube, a vacuum connection to said tube, perforated means covering the inlet of the vacuum connection to said tube, a hollow transition section connected to one end of one of said shells, said section having a wide, relatively narrow opening at the nonconnected end thereof, said nonconnected end opening of sufficient width to receive and pass therethrough the tubing in substantially flat unfolded form, said section tapering from greater to lesser width and lesser to greater depth to the connection with said shell, and means positioned next said opening for successively sealingly clamping and releasing said tubing.

2. Apparatus as in claim 1 wherein said greater width portion of said transition section extends in substantially horizontal orientation.

3. Apparatus as in claim 1 wherein said means positioned next to said opening for successively sealingly clamping and releasing said tubing is attached to and carried by the said section.

4. Apparatus as in claim 1 wherein said means positioned next to said opening for successively sealingly clamping and releasing said tubing comprises opposed portions of resilient construction which are inflatable and deflatable to clamp and release said tubing.

5. Apparatus for applying a portion of continuous strip of resilient tubing to a work piece comprising an expansion apparatus including an elongate shell forming a hollow tube, a vacuum connection to said tube, perforated means covering the inlet to the vacuum connection to said tube, a hollow transition section connected to one end of one of said shells, said section having a wide relatively narrow opening at the non-connected end thereof, said nonconnected end and opening of sufficient width to receive and pass therethrough the tubing in substantially flat unfolded form, said section tapering from greater to lesser width and lesser to greater depth to the connection with said shell, means positioned next said opening for successively sealingly clamping and releasing said tubing, means for moving said expansion apparatus to and fro along its longitudinal axis from a retracted to a forward position a distance at least equal to its own length, means for mounting a work piece in line with the longitudinal axis of said apparatus when the latter is in its retracted position whereby the expansion apparatus moves around said work piece in movement from the retracted to the forward position and frees it in reverse movement, and means for severing said tube after implacement on the work piece from said continuous source of tube.

6. Apparatus as in claim 5 wherein the means for moving the expansion apparatus comprises a wheeled frame carrying said expansion apparatus mounted on tracks.

7. Apparatus as in claim 5 wherein the means for mounting the work piece comprises a mandrel pivotable from a position in line with the axis of the expansion apparatus to a position substantially out of line therewith.

8. Apparatus as in claim 5 wherein the means for severing the tube comprises a heated wire positioned substantially at right angles to the longitudinal axis of the expansion apparatus and movable thereacross.

9. A process of applying flexible tubing to work pieces using tubing from a continuous elongate source thereof comprising expanding a first length of tubing at one free end of said source in a vacuum expansion device, inserting an adhesive treated work piece inside said expanded length, releasing said first length of tubing in said vacuum expansion device to contract on said work piece, removing said work piece and first length of tubing from said vacuum expansion device and simultaneously drawing a second length of tubing into said vacuum device, and severing said first length of tubing from said second length.

10. A process as in claim 9 including the step of clamping the nonfree end of the first length before expansion thereof in the vacuum expansion device.

11. A process as in claim 9 including the step of clamping in sealing fashion the end of the second length next said source before severing of said first length therefrom.

12. A process as in claim 9 including the steps of clamping the end of said second length next said source before severing and also stretching said tube before severing.

13. A process as in claim 12 including the steps of expanding said second length of tubing in said vacuum expansion device after severing the first length, inserting an adhesive treated work piece inside said expanded second length, releasing said second length of tubing in said vacuum device to contact on said second work piece, removing said second work piece and second length of tubing from said vacuum expansion device and simultaneously drawing a third length into said vacuum expansion device, and severing said second length of tubing from said third length.

References Cited in the file of this patent

UNITED STATES PATENTS

| | | |
|---|---|---|
| 2,201,707 | Sukohl | May 21, 1940 |
| 2,560,369 | Roberts | July 10, 1951 |
| 2,570,259 | McKinley | Oct. 9, 1951 |